United States Patent

[11] 3,569,618

[72] Inventors Masao Inaba;
Harunobu Nakamura, Tokyo, Japan
[21] Appl. No. 679,322
[22] Filed Oct. 31, 1967
[45] Patented Mar. 9, 1971
[73] Assignee Nippon Electric Company Limited
Tokyo, Japan
[32] Priority Nov. 4, 1966
[33] Japan
[31] 72,979

[54] SWITCHING DEVICE FOR MAGNETIC RECORDING/REPRODUCING APPARATUS
7 Claims, 3 Drawing Figs.

[52] U.S. Cl. .......... 178/6.6, 179/100.2
[51] Int. Cl. .......... H04n 1/38, H04n 5/44, H04n 5/78
[50] Field of Search .......... 178/6.6 (A); 179/100.2; 340/174.1

[56] References Cited
UNITED STATES PATENTS
2,968,692 1/1961 Ginsburg et al. .......... 178/6.6
2,979,557 4/1961 Schroeder .......... 178/6.6
3,084,214 4/1963 Jauernik .......... 178/6.6
3,290,438 12/1966 Okamura .......... 178/6.6
3,316,358 4/1967 Guisinger .......... 179/100.2

*Primary Examiner*—James W. Moffitt
*Assistant Examiner*—Steven B. Pokotilow
*Attorney*—Ostrolenk, Faber, Gerb and Soffen

ABSTRACT: The disclosure broadly teaches a switching device for rotary recording/reproducing systems preferably of the magnetic tape variety wherein signals picked up by the multiple rotating heads are composed by switching means into a continuous composite signal. Conventional switching apparatus of the alternating black-white ring and accompanying photocell reading assembly is employed for initially composing signals from selected heads into a partial composite signal. The partial composite signals are then composed into a final continuous composite signal by use of wave envelope detecting means for detecting the envelope of any one of the signals reproduced by the read heads and forming shaped pulses or combining the initially composed signals into a final composite continuous signal in a very high precision manner.

INVENTORS
MASAO INABA
HARUNOBU NAKAMURA
BY
OSTROLENK, FABER, GERB & SOFFEN
ATTORNEYS

INVENTORS
MASAO INABA
HARUNOBU NAKAMURA
BY
OSTROLENK, FABER, GERB & SOFFEN
ATTORNEYS

SWITCHING DEVICE FOR MAGNETIC RECORDING/REPRODUCING APPARATUS

This invention relates to recording/reproducing systems and more particularly to system of the video tape recorder type in which signals reproduced by the multiple rotating recording heads are composed into a composite continuous signal through the utilization of conventional means for providing an initial composition of selected signals and by detecting the envelope of the reproduced signals generated by any one of the recording heads for the purpose of forming shaped pulses employed to switch the initially composed signals in a manner to form the finally composed continuous signal in a highly precise manner.

The present invention deals with an improved television signal magnetic recording/reproducing apparatus conventionally comprised of rotating plural-heads in which a plurality of the signals reproduced by the rotating heads are switched in a highly precise manner through a switching device to yield a continuous composite signal.

In conventional plural-head-type video tape recorders, each of the rotating read heads cooperates with selected usually diagonally aligned patterns on a tape which, in composite form, represent a signal such as a television signal. Such signals must be combined in a precise and accurate manner in order to form a suitable signal for activating a receiver to produce a picture having good quality and definition. Conventional systems typically employ switching means for generating pulses (commonly referred to as PEC signals) whose frequency is dependent upon the angular speed of the rotating reading head block. One conventional method of generating PEC signals is to provide an alternating black-and-white ring mounted upon the rotating head block and a photosensitive device such as, for example, a photocell which generates pulses representative of the rotation of the black-and-white ring in order to determine the switching phase of a switching device to compose a plurality of reproducing signals generated by the read heads into a continuous composite signal.

The difficulty of manufacturing a highly accurate head block comprised of the read heads, and the black-and-white ring results in the introduction of errors in operation which causes an error in the rotating phase angle between the PEC signals and the reproduced signals derived from each of the read heads. These errors cause the switching device to inject errors into the switching phase thereby effecting the quality of the desired composite signal.

One principal feature of the instant invention is that of providing switching means for generating highly precise switching signals in a manner such that the switching phase is accurately determined regardless of the rotational phase angle relationship between the PEC signals and the plurality of reproducing signals derived from the read heads. As a result of this unique approach, there is no necessity for increasing the quality of manufacturing techniques on the production of rotary-type heads nor for providing any form of compensating means to correct for such errors thereby permitting a marked increase in the operating efficiency of the switching device.

The instant invention is comprised of a rotary-type head block having a plurality of read heads for reproducing signals read from a linearly moving tape. Rotation of the heads is normally transverse to the direction of movement of the tape. The reproduced signals representative of the patterns provided on the tape are combined in a first composing operation. The conventional switching means is employed for the purpose of controlling the switching phase of the primary combining process.

Switching control means are provided for detecting the envelope of the reproduced signals from any one of the read heads for the purpose of generating switching pulses. These pulses are applied to a final switching stage in which the initially combined signals are finally combined into a composite continuous signal wherein the switching is carried out in the final switching stage in a highly precise manner.

It is therefore one object of the instant invention to provide novel electronic means for use in rotary type multiple head recording/reproducing systems wherein reproduced signals from each of the read heads are combined in a highly precise manner to form a composite continuous signal.

Another object of the instant invention is to provide a novel switching device for use in rotary head recording/reproducing systems having multiple read heads in which the reproduced signals generated by the read heads are initially combined into a plurality of signals lesser in number than the number of read heads through the use of conventional switching means and wherein the initially combined signals are combined in a final switching stage under control of pulses generated through the detection of the wave envelope of signals from any one of the read heads to produce a continuous composite output signal in which the switching phases of the initially reproduced signals are controlled in a very precise manner. These as well as other objects of the instant invention will become apparent when reading the accompanying description and drawings in which:

Figure 1:
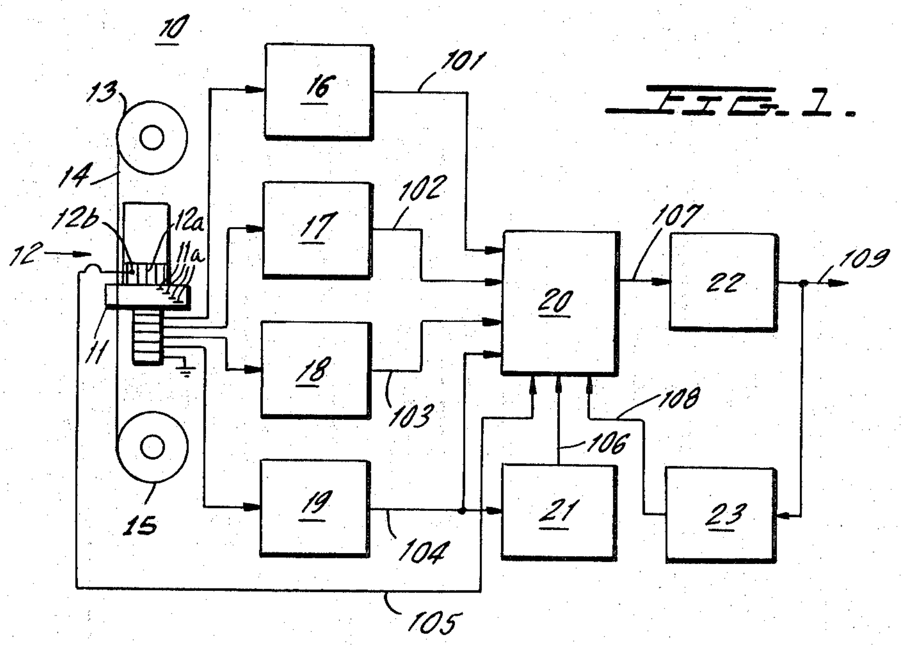
FIG. 1 is a schematic diagram illustrating a portion of the reproducing system employed in television signal magnetic recording/reproducing apparatus of the rotary head type and incorporating the novel switching means of the present invention.
Figure 2:
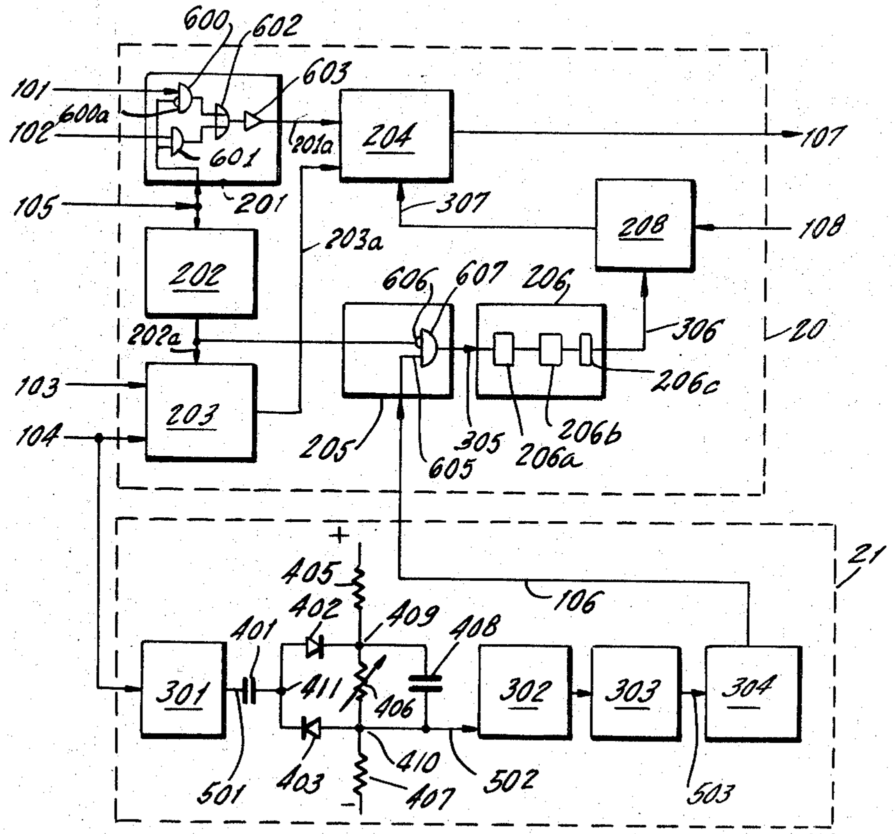
FIG. 2 is a schematic diagram showing the novel switching means of FIG. 1 in greater detail.

FIG. 1 is a schematic diagram showing a portion 10 of the reproducing system employed in conjunction with rotary-type multiple head video tape recorders (VTR). The recording/reproducing tape 14 has recorded thereon, in any suitable fashion, magnetic patterns which, when transformed into a composite signal, represent the information necessary for driving a receiver (not shown) to form a television image. The arrangement of the magnetic patterns on the tape are typically as shown in FIG. 2 of U.S. Pat No. 3,267,207 assigned to the assignee of the present invention. The recording/reproducing tape 14 is delivered from a tape supply reel 13 to pass the recording head station to a takeup reel 15, which reels are rotated by suitable driving means (not shown) to linearly move the tape 14 past the reading station.

The signals recorded on tape 14 are picked up and reproduced by means of the rotary head block 11 which rotates in a plane substantially perpendicular to the direction of motion of tape 14, the rotatable head 11 being driven by suitable motor means (not shown). The signals recorded on tape 14 are picked up by individual read heads 11*a* provided on the periphery of head 11. The reproduced signals are each individually applied to an associated preamplifier 16—19, respectively, assigned to each read head. The reproduced and amplified signals are then transferred to a switching device so as to be composed into a continuous signal.

As can clearly be seen from FIG. 1, the outputs 101—104 of each of the preamplifiers 16—19, respectively, are applied to a switching device 20 where they are combined to form a single composite signal. The output 104 of amplifier 19, for example, is further applied as an input signal to an envelope detecting circuit 21 for generating pulses dependent upon the envelope shape of the output signal 104. Whereas the output 104 is shown as being applied to envelope detection circuit 21, it should be understood that any one of the outputs 101—103 may alternatively be employed to control the operation of wave envelope detection circuit 21 without in any way effecting the successful operation of the signal composition.

The pulses generated by circuit 21 very accurately determine the switching phase of switching device 20. Thus, the pulses applied to switching device 20 very accurately activates only that reproduced signal which should be passed to output 107 at any given instant. The reproduced signals are then demodulated by demodulator circuit 22 to provide the final output signals at terminal 109 for use in driving a television receiver, for example.

The demodulated television signals are also applied to a pulse generator 23 which generates horizontal synchronizing signals at a rate dependent upon the demodulated television signal applied to the input terminal. Synchronizing signals are employed to determine the switching phase of switching device 20.

The conventional signal generator 12, provided for the purpose of generating PEC signals, may typically be comprised of a black-and-white ring 12*a* rotatable with the rotary head 11 whose rotation is sensed by a photocell 12*b* to generate PEC signals applied through line 105 to switching device 20, which switching signals are employed in a manner to be more fully described.

The functions of the switching device 20 and the envelope detecting circuit 12, shown in greater detail in FIG. 2, will now be described in conjunction with the waveforms of FIG. 3 which indicates the phase relationships among the various signals. For purposes of simplicity, the waveforms of FIG. 3 appearing in each of the lines connected between and amongst the circuits of FIG. 2 have been designated by like numerals.

The reproduced signals 101 and 102 amplified by circuits 16 and 17, respectively, are applied as inputs to a first switching circuit 201, while the remaining reproduced signals 103 and 104 amplified by circuits 18 and 19, respectively, are applied to a second switching circuit 203. The first switching circuit 201 combines the reproduced signals 101 and 102 into a composite signal 201*a* under control of the PEC signal 105 and transfers signal 301 to a third switching circuit 204.

The switching control signal 303 applied to the second switching circuit 203 is obtained by passing the PEC signal 105 through delay circuit 202 which generates an output signal 203*a* phase delayed by an amount A (see FIG. 3) sufficient for the purpose of composing or combining the reproduced signals 103 and 104 in switching circuit 203. The output signal 203*a* of the second switching circuit 203 is applied as one input to the third switching circuit 204 which also receives the composite signal 201*a*. The signals 301 and 202*a* are then further combined with one another under control of a switching signal 307 of a very precise phase relative to the signals 201*a* and 202*a* as to form the final composite continuous signal 107.

Considering the manner in which signals 101 and 102 are combined, it should be noted that the significant portions of these signals which must be preserved are represented by the envelopes 101*a* and 102*a* respectively, whereas the remaining portions of the signals are of no interest in forming the final composite signal 107. As can clearly be seen, the adjacent leading and trailing edges of the envelopes 101*a* and 102*a* immediately adjacent one another are time-spaced by a rather significant amount E so that the exact moment at which switching occurs need not be highly accurate. One manner in which switching may occur will be described with reference to the first switching circuit 201. The signals 101 and 102 are each applied to an associated AND gate 600 and 601, respectively. The PEC signal 105 is applied to the remaining input of AND gate 601 and is simultaneously applied to the inhibit input terminal 600*a* of AND gate 600. When the PEC signal is at a level F, AND gate 601 prohibits signal 102 from passing through the AND gate and then through OR gate 602 to amplifier 603. Simultaneously therewith, when the PEC signal is at level F, AND gate 600 is not inhibited, allowing signal 101 to pass through AND gate 600, OR gate 602 and amplifier 603 to appear in output line 201*a*. When the PEC signal 105 abruptly moves to level G, AND gate 601 is enabled, allowing signal 102 to pass through AND gate 601, OR gate 602 and amplifier 603 to appear in output line 201*a*. At this time, level G inhibits AND gate 600, prohibiting signal 101 from passing through AND gate 600. The circuit arrangement of first switching circuit 201 is merely exemplary and any other arrangement may be employed, depending only upon the needs of the user. However, the arrangement of first switching circuit 201 clearly described describes the manner in which the individually reproduced signals 101 and 102 are combined to form the composite waveform 201*a*.

After an appropriate delay is imposed upon PEC signal 105 by delay circuit 202, the delayed PEC signal 303 is applied to second switching circuit 203 for the purpose of combining individually reproduced signals 103 and 104. Obviously, the second switching circuit 203 may have a circuit configuration of they type described with reference to first switching circuit 201 or any other switching circuit arrangement may be employed to provide for composition of the signals.

The final composition, or combination, of signals 201*a* and 203*a*, which is performed by switching circuit 204, is carried out in a similar manner, it being understood that third switching circuit 204 may be comprised of circuitry similar to that shown with regard to first switching circuit 201.

In order to assure highly precise switching in the third switching circuit 204, a switching phase determining pulse 106 s is generated in the following manner:

The envelope of individually reproduced signal 104 is applied to the input of an amplifier circuit 301 which may, for example, be an automatic gain control amplifier. The amplified output signal 501 is applied to a circuit comprised of capacitor 401, diodes 402 and 403, resistors 405 and 407, adjustable resistor 406 and capacitor 408, which circuitry operates so that only a portion of the signal 501 above a specific amplitude will be passed, which operation is generally referred to as "pedestal clip."

The series connected resistors 405—407 are coupled between the positive and negative terminals of a suitable DC power supply (not shown). The selection of the resistance values of resistors 405 and 407 and the adjustment of adjustable resistor 406 establishes the voltage levels at terminals 409 and 410, respectively. Thus, the signal appearing at terminal 411 will be passed to line 502 (due to the polarity of diodes 402 and 403) only if the signal at terminal 411 is more positive than the voltage level at terminal 409, or more negative than the voltage level at terminal 410. The resultant signal is shown by waveform 502 in FIG. 3, wherein it can be seen that only the wave envelope portions 501*a* of waveform 501 are preserved, whereas the remaining signals are clipped.

The waveform 502 is applied to an amplitude limiting amplifier 302 which amplitude limits the output signal. The signal is then subjected to the envelope detection by envelope detection circuit 303 yielding the resultant signal 503. The signal 503 is then shaped by a waveform shaping circuit 304 to produce the signal 106 which can clearly be seen to be inverted 180° relative to waveform 503. The portion D of waveform 503, shown in FIG. 3, and the portion B of waveform 106 is caused to appear as a result of signal leakage of the signals 101, 102, and 103, which is picked up by the reproducing head associated with signal 104 in the case when the leakage signals are found to exceed the pedestal clip levels established at terminals 409 and 410. The leakage signals interfere with the determination of the switching position for control of the third switching circuit 204. For this reason, a suppressor, or removing, circuit 205 is provided to suppress or remove the interfering signals B and D by employing the phase delayed PEC signal 303 to suppress those portions of the signal 106 containing the interfering signals. One manner in which suppression can be obtained is by applying signals 106 and 303 to the input terminal 605 and the inhibit input terminal 606, respectively, of an AND gate 607. Thus, the input signal 106 will be passed by AND gate 607 to appear in line 305 except for those times when the delayed PEC signal 303 is at the level G which inhibits AND gate 607 from passing signal 106, thereby suppressing portions B of signal 106. Obviously, when the delayed PEC signal 303 returns to level F, AND gate 607 is again enabled to pass signal 106 to output line 305 thereby forming the waveform 305 shown in FIG. 3.

Figure 3:
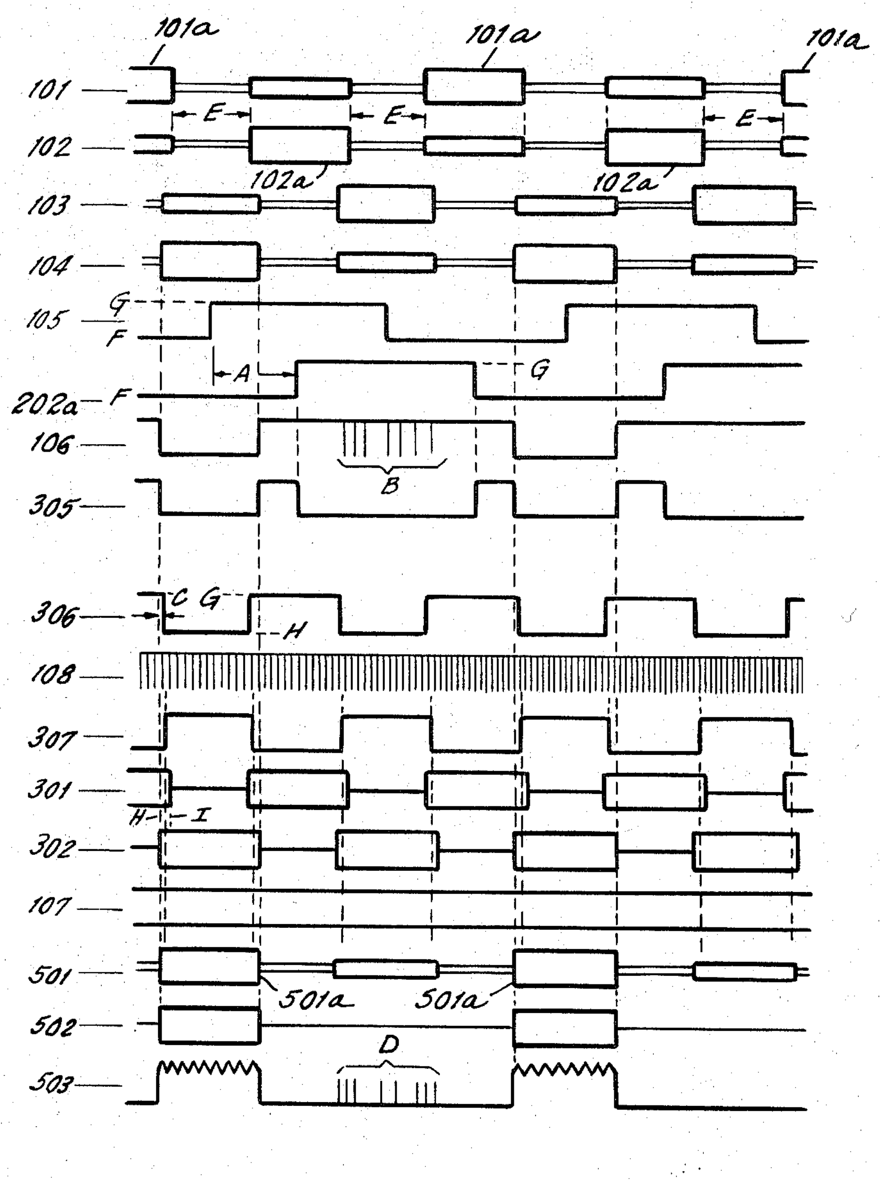
FIG. 3 shows a plurality of waveforms representing the phase relationship among the various signals and useful in explaining the principles of operation of the invention.

The output signal 305 is applied to a wave-shaping circuit 206 which delays the signal by an amount C shown in FIG. 3, so that the signal 305 occurs at the midpoint between the overlapping phases of signals 301 and 302. For example, considering the waveforms of FIG. 3, it can be seen that the trailing and leading edges of signal 306 (which constitutes the delayed waveform 305) occurs at the midpoint between the leading and trailing edges H and I of signals 302 and 301, respectively, The delay is provided by means of the delay circuit 206*a*. After being suitably delayed, signal 305 is applied to the input of a ringing oscillator 206*b* to generate a square-wave signal of four times the frequency repetition rate of signal 106. The signal is then applied to a final wave-shaping circuit 206*c* to form the final signal 306 developed by the wave-shaping and delay circuit 206.

The final switching signal which is generated by switching signal generator 208 is determined and controlled by both the signal 306 and the horizontal synchronizing signal 108 developed by the demodulated output signal 109 (see FIG. 1), which signal operates the pulse generator 23 of FIG. 1 at a rate dependent upon the demodulated television signal. The switching signal 307, which is inverted 180° relative to signal 306, has leading and trailing edges which occur in time synchronism with a horizontal switching pulse such that the leading edge of the square-wave pulses of signal 307 are in time synchronism with the first horizontal synchronizing pulse occuring after signal 306 reaches level H and such that the trailing edges of the pulses 307 are in time synchronism with the first horizontal synchronizing pulse occuring after signal 306 reaches level G.

The switching signal 307 si is applied to the third switching circuit 204 which may be of a design substantially similar to first switching circuit 201 in order to accurately and precisely combine the signals 301 and 302, which were generated as a result of initial combining operations performed by circuits 201 and 203. The high degree of accuracy is derived as a result of employing a wave detection circuit 21 for the purpose of generating the switching pulses 307. As was previously noted, it should again be made clear that the wave envelope detection circuit 21 may derive its input signal from the outputs of any one of the remaining amplifier circuits 16—18 and the selection of the driving signal being derived from amplifier 19 has been described merely for purposes of explaining the operation of one preferred embodiment.

It can therefore be seen from the foregoing description that the instant invention completely eliminates the error occuring in the rotating phase angle between the PEC signals and the read head reproducing signals by developing a switching signal for application to the final switching device through envelope detection of one of the plurality of reproduced signals and conversion of the detected envelope into a pulse employed for accurate switching purposes. This technique completely eliminates the need for providing compensating circuitry to accurately determine the switching phase of the final switching device, while at the same time utilizing the conventional switching technique or preliminary combining of the plural reproduced signals.

Although there has been described a preferred embodiment of this novel invention, many variations and modifications will now be apparent to those skilled in the art. Therefore, this invention is to be limited, not by the specific disclosure herein, but only by the appending claims.

We claim:

1. Switching means for use in television signal recording and/or reproducing systems having a rotary-type head assembly comprised of plural read heads for reading patterns on a moving tape to reproduce television signals representative of said patterns; said switching means comprising:

first means receiving reproduced television signals from one of said read heads for removing those components whose levels are less than a predetermined level;

means for envelope-detecting the output signal of said removing means and means coupled thereto for producing a first switching signal;

first switching means for combining the reproduced television signals generated by said read heads; and said first switching means being controlled by said first switching signals to accurately combine said reproduced television signals in accordance with their proper relationship.

2. The switching means of claim 1 further comprising:

means controlled by said rotary head assembly for generating switching signals;

a plurality of second switching means for combining selected ones of said reproduced signals, said plurality of second switching means being controlled by said second switching signals to combine selected portions of the reproduced signals applied thereto; and said first switching means receiving the combined signals from said plurality of second switching means and being controlled by said first switching signals to combine selected portions of the initially combined signals to form a composite continuous signal.

3. The switching means of claim 2 further comprising delay means coupled between said switching signal means and at least one of said plurality of second switching means for delaying said second switching pulses by an amount sufficient to cause proper switching of the reproduced signals applied to the second switching means coupled to said delay means.

4. The switching means of claim 2 wherein:

said switching signal generating means is comprised of a ring provided for rotation with said rotary head assembly comprised of alternating sectors of contrasting brightness;

photosensitive means cooperating with said ring for generating said switching signals.

5. The switching means of claim 2 further comprising means receiving said first and second switching signals and being coupled to said first switching means for suppressing selected portions of said first switching signal under control of said second switching signal.

6. The switching means of claim 5 further comprising delay means coupled to said suppressing means for delaying output signals from said suppressing means by a predetermined amount.

7. The switching means of claim 6 further comprising means coupled between said first switching means and said delay means for generating first switching pulses to be applied to said first switching circuit means:

means coupled to the output of said first switching means for demodulating said composite continuous signal;

means coupled to said demodulating means for generating horizontal synchronizing signals;

said means for generating said switching signals being further coupled to the output of said horizontal synchronizing pulse signal generating means for precisely controlling the final switching pulses to be in synchronism with said horizontal synchronizing pulses and to be in proper phase relationship with said reproduced signals derived from said read heads.